Sept. 11, 1951 T. S. SKILLMAN ET AL 2,567,241
VALUE INDICATION FOR ARTICLE DISPENSING SYSTEMS
Filed Aug. 16, 1950 3 Sheets-Sheet 1
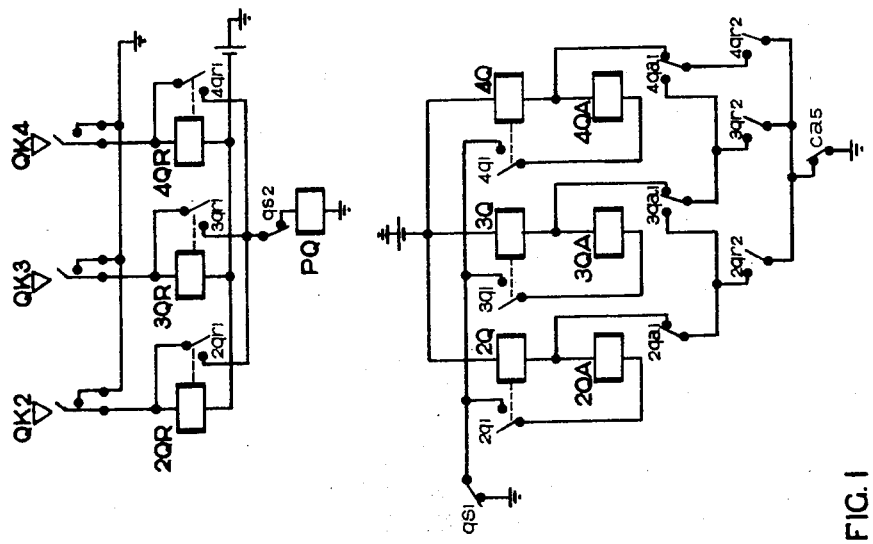
FIG. 1
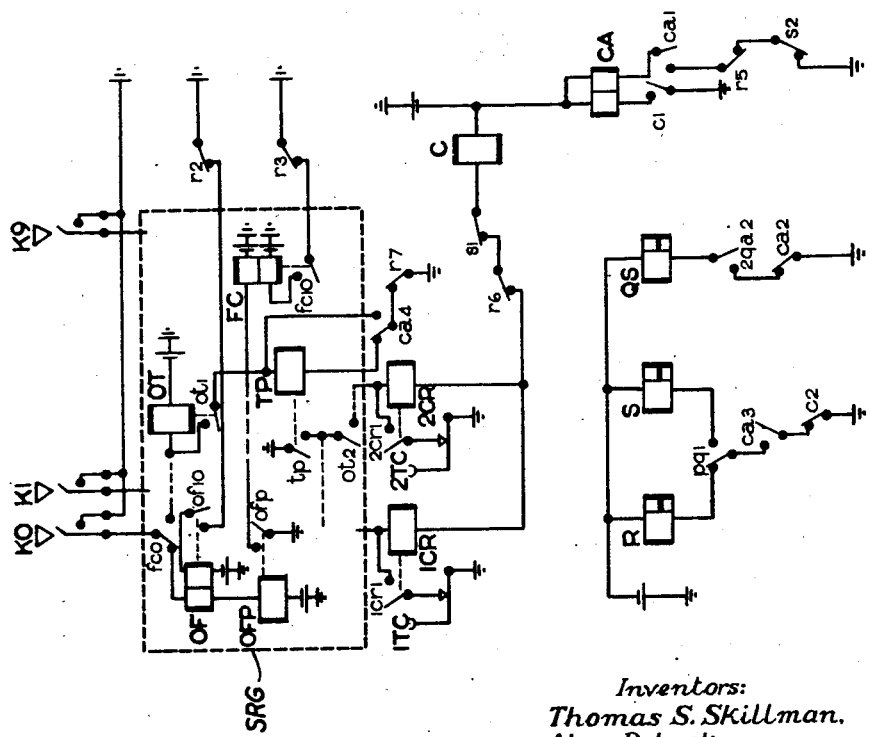
*Inventors:*
*Thomas S. Skillman,*
*Alan D. Lackey*
*By Ward, Crosby & Neal*
*Attorneys.*

Patented Sept. 11, 1951

2,567,241

UNITED STATES PATENT OFFICE 2,567,241

VALUE INDICATION FOR ARTICLE DISPENSING SYSTEMS

Thomas S. Skillman, Mosman, near Sydney, and Alan D. Lackey, McMahon's Point, near Sydney, New South Wales, Australia, assignors to Communication Engineering Pty. Limited, Cammeray, near Sydney, New South Wales, Australia, a corporation of Australia Application August 16, 1950, Serial No. 179,698
In Australia August 22, 1949

10 Claims. (Cl. 235—61)

The invention relates to article dispensing systems, and more specifically to the value indication of articles dispensed in quantity.

Of the many facilities provided hitherto by article dispensing systems, value registering and quantity selection are of particular note. Systems incorporating the former facility mark the value charged for each article as it is dispensed at an indicating and/or recording device. On the other hand the latter facility permits an operator to select from the system a predetermined quantity of articles of the same character without repeating the selection for each succeeding article. A system combining these two facilities, however, suffers the disadvantage that for each article dispensed the full value is registered irrespective of the quantity in which a kind of article has been selected.

In grocery stores and similar establishments it has been the practice to offer customers a reduction on articles purchased in quantity, e. g., one article for one shilling, two for one and ninepence, three for two and sixpence or where a discount in ration tokens is offered, one article requires two coupons or points and two articles require three coupons or points. Furthermore, occasions can arise where the value of an article is raised when sold in quantity, for example, when the same article is available under a rationing scheme for a low price and in unlimited quantity for a higher price. Hence stores employing article dispensing systems have been unable to participate in these particular schemes.

The abovementioned disadvantage is overcome according to the invention by providing an article dispensing system of the abovementioned type with facilities for value variation with quantity. Value variation means are interposed between the article dispensing means and the value registering means and operable by the quantity selection means to transmit automatically to said value registering means depending on the selected quantity, indications representing different values for articles of the same kind dispensed in immediate succession.

According to a further feature of the invention the quantity selection means include relays and contacts of these relays are included in the value registering circuits to cause the transmission of a particular value indication to the value registering means.

It is another feature of the invention to include rotary switches in the value varying means and to step these switches up step by step by the operation of the quantity selection means for the transmission of indications representing different values to the value registering means.

These and further features of the invention will be more readily understood from the following description in connection with the drawings in which:

Fig. 1 shows a circuit arrangement for providing quantity selection in an article dispensing system.

In the following detailed description, reference is made to value reduction but it must be understood that, as mentioned above, the invention is applicable in the same way when a value increase for quantity selection is required.

It is customary in grocery stores and similar concerns to offer the clientele a price discount on articles of the same character purchased in quantity. This practice, however, is not adopted for all the items in stock. Thus in providing this facility an article dispensing system has to allow for the carriage of articles for which a fixed price is charged irrespective of the quantity dispensed, and also for the carriage of articles for which differing prices are charged depending upon the quantity of articles of the same character dispensed.

Figure 4:
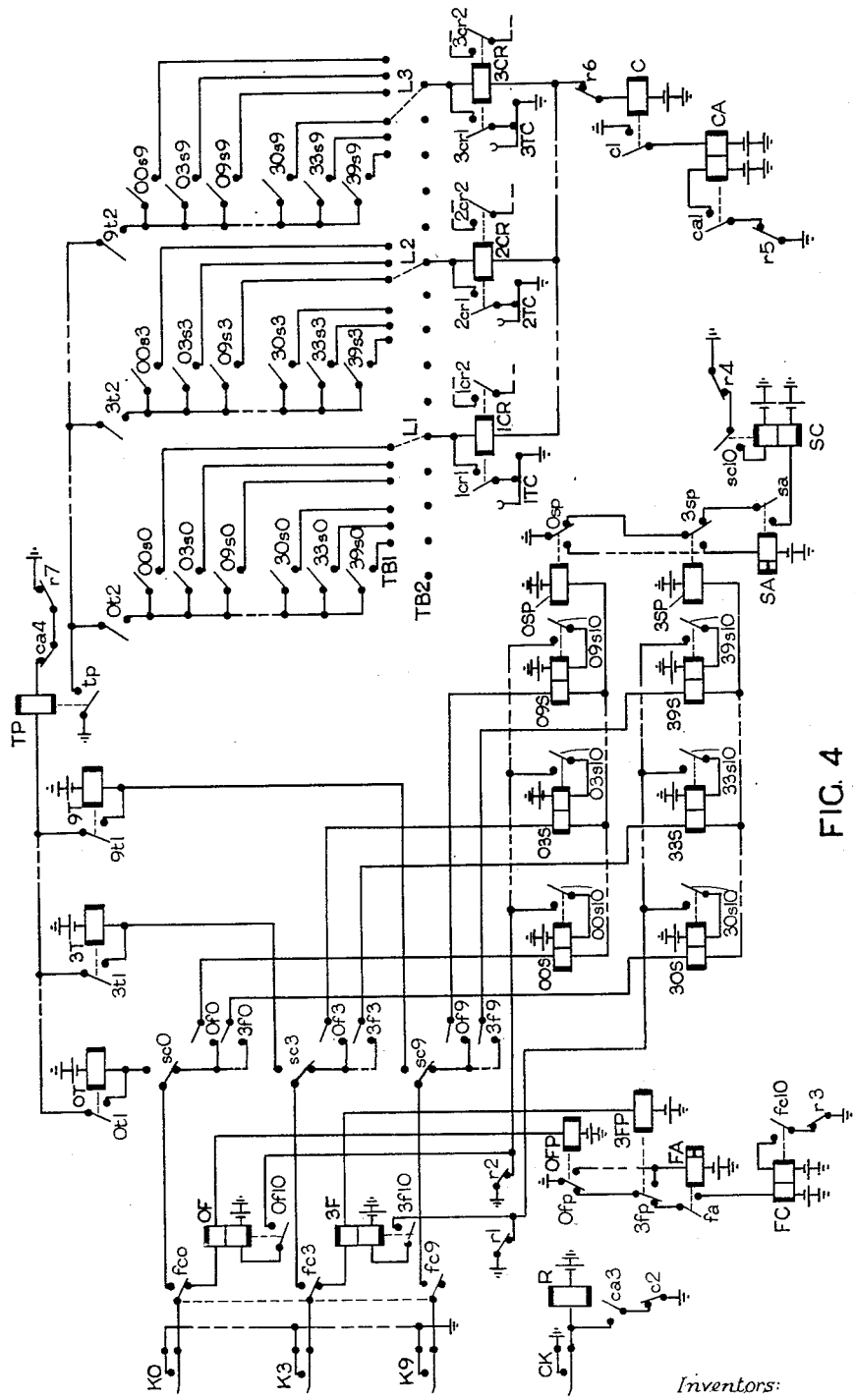
Fig. 4 shows the circuit of a relay group for selecting articles in an article dispensing system.

Fig. 4 shows the circuit diagram of a relay group which may be employed for the selection of articles in an article dispensing system. This relay group, which will be described generally herein, is shown and described in greater detail and claimed in co-pending U. S. application Serial No. 110,149, filed August 13, 1949, by P. L. Law for "Improvements in Selection Circuits."

In the drawing the operator's position consists of a row of ten keys K0 . . . K3 . . . K9 which are used to key up the various digits of the code designating a particular kind of article.

The operator's position furthermore comprises a "cancel" key CK which is operated whenever one of the keys K0 to K9 has been wrongly pressed or when a storage bin is empty. Key CK energises a release relay R to restore all circuits back to normal.

The keys K0 to K3 are connected with the relay 0F to 3F, having contacts 0f0 . . . 0f10 and 3f0 . . . 3f10 respectively, of the first-digit relay group. In the example shown it is assumed that only four hundred items have to be selected and thus no first-digit relays are provided for the keys K4 to K9. Each of the relays is operated over an individual pilot relay 0FP to 3FP (with contacts 0fp to 3fp). The pilot relays operate the auxiliary slow release relay FA which over its contact fa prepares a circuit for the first-digit changeover relay FC with contacts fc0 to fc10. This relay operates as soon as the operator has released the key pressed for the selection of the first digit of the stock number. The FC relay switches the connection from the keys K0 to K9 over to one of the second-digit relay groups, in accordance with the first digit selected before. One second-digit relay group corresponds with one of the first-digit relays. Each of the second-digit relay groups consists of ten relays and a pilot relay. Two of these relay groups (the first group and the fourth group) are shown in the drawing, the first group consisting the ten relays 00S . . . 03S . . . 09S with contacts 00s0 to 00s10; 03s0 to 03s10; 09s0 to 09s10 respectively and the fourth group consisting of the ten relays 30S . . . 33S . . . 39S with contacts 30s0 to 30s10; 33s0 to 33s10; 39s0 to 39s10 respectively. The contacts 00s0 to 00s9; 03s0 to 03s9; 09s0 to 09s9 of the first group and the corresponding contacts of all the other second-digit relay groups are connected with individual terminals TB1 of a jumpering frame, while other terminals TB2 of the jumpering frame are connected with the CR relays which initiate the release of the various articles from their respective storage bins. Three of these relays (1CR, 2CR, 3CR) are shown only, but for each storage bin one CR relay is connected with one of the terminals TB2 of the jumpering frame. By connecting the various terminals TB1 with the terminals TB2 as shown by the dotted leads L1, L2, L3 any one of the CR relays can be related to one of the coded designations thus making the code independent of the actual position of the article in the storage arrangement. In this way it is possible to rearrange the articles in the storage bins without altering their code. Furthermore coded designations can be reserved for various kinds of articles, which will be added later to the stock.

The pilot relays 0SP to 3SP with contacts 0sp to 3sp for the second-digit relay groups fulfil the same functions as the pilot relays 0FP to 3FP of the first-digit relay group. An auxiliary slow release relay SA operated by one of the pilot relays 0SP to 3SP prepares over its contact sa a circuit for changeover relay SC with its contacts sc0 to sc10.

When the operator releases its key again the relay SC switches the circuit from the keys K0 to K9 over to the third-digit relay group with the relays 0T . . . 3T . . . 9T. According to the key pressed for the third-digit selection one of the relays 0T . . . 3T . . . 9T is energised and closes the contacts 0t1, 0t2 . . . 3t1, 3t2 . . . 9t1, 9t2 respectively. A third-digit pilot relay TP then operates its contact tp and thus completes a circuit over one of the closed contacts of the third-digit relays and one of the contacts of a second-digit relay to one of the terminals TB1 and from there over one of the leads (L1, L2, L3) and one of the terminals TB2 to one of the CR relays thus initiating over one of its contacts the release of a particular article from its storage bin.

The CR relays are energised via a control relay C which in turn operates over its contact c1 the auxiliary relay CA. When one of the relays 1CR, 2CR, 3CR is energised it closes its contact 1cr2, 2cr2 or 3cr2 and operates a magnet, a clutch or any other device which releases an article from its storage bin. Over the contact 1cr1, 2cr1, 3cr1 respectively a locking circuit is closed for the respective CR relay over a trip contact (1TC, 2TC, 3TC) which is temporarily interrupted when an article falls out of a bin. This interruption of the circuit releases the energised CR relay and the C relay. Over the contact c2 and the contact ca3 of the energised relay CA the release relay R will operate and at its contacts r1 to r7 will break all the locking circuits for the various relays thus restoring all circuits to normal. At contact r5 the circuit for the CA relay is broken so that this relay in turn interrupts the circuit for relay R at contact ca3. The relay R is a slow release relay to ensure that all relays have been restored to normal before the relay R closes again its contacts r1 to r7.

Although the following description in connection with Fig. 1 depicts one particular arrangement for the provision of quantity selection, it should be understood that the invention is not thereby limited to this form. The description of this arrangement as well as the remainder of the equipment shown in Fig. 1 is included merely to give a clear understanding of the manner in which the pricing or other value indication of an article is associated with selection and more particularly of the manner in which price discounting is associated with quantity selection.

Referring now to Fig. 1, the dotted rectangle labelled SRG shows schematically only that portion of the selecting relay group of Fig. 4 directly connected with the quantity selecting devices of this invention. The relationships of the circuits within the added rectangle to the remaining circuits shown in Fig. 4 are obvious from a mere comparison of the two circuits.

To select an article in quantity, quantity keys QK2, QK3 and QK4 are provided which are operated prior to the selection of the wanted article by the keys K0, K1 . . . K9. Quantity key QK2 would therefore prepare the dispensing of two articles, quantity key QK3 the dispensing of three articles, and so on.

The operation of a quantity key leads to the storing, within a quantity relay group, of a condition peculiar to the particular quantity keyed. When the article selection keys are operated the selecting relay group SRG is actuated and stores therein a condition peculiar to the particular kind of article keyed.

Connected to the selecting relay group SRG are relays, individual to each kind of article supplied by the system. To simplify the description, however, only two such relays (1CR and 2CR) are shown in the drawing. By each operation of such a relay over the selecting relay group SRG one article of the corresponding kind is released from storage and simultaneously the price of this article is marked at a pricing unit (PU in Fig. 2 and Fig. 3) which may be any structure which permits the registering of value indications in response to electrical signals.

The equipment shown on the right in Fig. 1 and the slow-release relays S and QS operate the quantity selection, so that after the completion of each operation of the selecting relay group SRG, this operation is repeated as many times as is necessary to release articles according to the quantity keyed. While relay S goes on continually repeating the operation of the selecting relay group SRG, the condition stored in the quantity relay group changes with each succeeding article dispensed to conform with the smaller quantity still required to be dispensed. When the operation of the selecting relay group SRG has been repeated by relay S for the dispensing of the last article of the quantity the condition of the quantity selection unit is such that relay QS is operated which in turn releases the whole of the quantity selection unit. Relay S is thus released and after the last article has been dispensed the operation of the selecting relay group SRG is not repeated. Relay S then operates to release the stored condition in the selecting group SRG and the whole electrical system is reverted to normal.

The transmission of value indications accompanying each dispensed article, as stated earlier, is controlled by the contacts of the corresponding relay operated over the selecting relay group. According to the invention a further arrangement is associated with the quantity selection unit and the pricing unit so that the price indicated for each succeeding article of a selected quantity can be varied by any predetermined amount.

In one embodiment of the invention this facility is effectively provided by extra contacts of the quantity relays such as relays 2Q, 3Q and 4Q. One set of contacts is provided for each denomination occurring in the price of an article to be dispensed in quantity with different prices. With the changing condition of the quantity relay unit as articles are dispensed, these relays operate in turn and their contacts select the respective price of each article dispensed.

In another embodiment of the invention (Fig. 3) the selection of different prices in connection with the dispensing of successive articles of the same kind is controlled by a rotary switch with contact banks SS1 and SS2 for each denomination respectively. For the first dispensed article of the quantity the switch does not move but remains on the first contact of the bank, which is its normal position, and the first price selection therefore takes place over this contact. The operation of the switch is controlled by relay S so that each time relay S operates to repeat the operation of the selecting relay group SRG, the rotary switch steps onto the next contact of the contact bank and the pricing of the respective article is thus selected and indicated. When the relay R operates, thereby releasing the electrical selection circuits, the wiper arms of the rotary switch return to their normal position on the first contact.

A more detailed description of the circuit will now be given. All relays are shown in their unoperated condition. To simplify the illustration of the circuits the detached contact method is used in the diagrams, the contacts of the various relays appearing in the circuits where they are used irrespective of the position of the corresponding relays. The relationship between relays and contacts is indicated by identical reference letters, capital letters being used for the relays and small letters for the contacts with a following figure indicating the number of the particular contact.

In the selection system shown in Fig. 1, it is a requirement that the desired quantity key be operated before commencement of keying for the individual articles. Upon operation of the quantity key, say key QK3 to select three articles of the same kind, a circuit is completed for the operation of the relay 3QR, from battery, winding of relay 3QR, contact of key QK3 which is now closed, to earth. The relay 3QR in operating closes its contact 3qr1 thereby locking itself and operating the relay PQ from battery, over winding of relay 3QR, contact 3qr1 (closed), contact qs2, winding of relay PQ to earth. Over contact 3qr2, now closed, a circuit is completed for the operation of relay 3Q from battery, over winding of relay 3Q, break contact 3qa1, contact 3qr2 (closed), contact ca5 to earth.

Operation of the relay PQ actuates the changeover contact pq1 thereby preparing the relay S for operation, and the operation of relay 3Q closes the contact 3q1 thereby preparing relay 3QA for operation. The chain of events above described occurs after operation of any of the quantity keys and prior to commencement of keying up the individual articles by means of the keys K0, K1 . . . K9.

If now the code of an article is keyed up on keys K0 . . . K9 the respective relay associated with the relay group SRG will be caused to operate. While in the selecting relay group SRG in Fig. 1 only the relays for a 2-digit selection are shown to simplify the diagram it must be understood that a 3-digit code can be used for selection as described above in connection with Fig. 4. In this case the relays OF and OT are relays of the first and third digit selection respectively. Only one alteration is necessary in the prior arrangement shown in Fig. 4 to keep the OT relay or a corresponding digit relay operated during the quantity selection. This alteration consists in changing the contact ca4 to a changeover contact and connecting the make contact thereof to the connection between the TP relay and the digit relays, for example relay OT, to keep this relay operated when relay TP releases as shown in Fig. 1 and described in detail later on.

In Fig. 1 relays 1CR and 2CR represent the individual article dispensing relays and it must be understood that there will be as many of these relays as there are articles of different character carried by the dispensing system. In the embodiment shown, it is so arranged that the relay 1CR is associated with a kind of article which is sold on a fixed price basis irrespective of quantity. On the other hand the relay 2CR is associated with a kind of article for which quantity discount of price is provided.

If, for example, key K0 is temporarily pressed, relays OF and OFP are operated from earth over key K0, contact fc0, one winding of relay OF, relay OFP to battery. Relay OF closes its contact of10 and establishes a locking circuit from battery over its second winding, closed contact of10, contact r2 to earth. Relay OFP closes its contact ofp and energises relay FC which remains locked over its second winding, contact fc10, contact r3, to earth after key K0 has been released and relay OFP is de-energised opening its contact ofp. Relay FC changes over its contact fc0, so that at a second operation of key K0 relay OT is operated from earth over key K0, contact fc0, relay OT to battery. Relay OT closes its contacts ot1 and ot2. Contact ot1 prepares a circuit for relay TP, which operates as soon as key K0 is released, from earth over contacts r1 and ca4, relay TP, contact ot1, relay OT to battery. When relay TP closes its contact tp, a circuit is closed from earth over contacts tp and ot2, relay 2CR, contacts r6 and s1, relay C to battery. Although the selection of the relay 2CR with the code 00 is shown, it must be understood that any other relay, for example 1CR, can be selected in a similar manner and that, as mentioned above, 3-digit codes can be used.

Relay 2CR in operating locks itself over contact 2cr1 via trip contact 2TC to earth. The relay C in operating closes contact c1 and opens contact c2. Contact c1 in closing completes a circuit from battery over one winding of the relay CA, contact c1 to earth thereby operating the relay CA. The operation of relay CA closes contacts ca1 and ca3, opens contacts ca2 and ca5, and changes over contact ca4. Contact ca1 in closing locks the relay CA over its second winding via battery, second winding of relay CA, contacts ca1, r5 and s2 to earth. The change over of contact ca4 de-energises relay TP in the selecting relay group SRG and keeps relay OT locked. Relay 2CR remains operated over its contact 2cr1 and trip contact 2TC. Contact ca5 removes the short circuit from relay 3QA by taking earth off the connection between relays 3Q and 3QA, thus allowing relay 3QA to operate via the circuit: battery, winding of relay 3Q, winding of relay 3QA, operated contact 3q1, contact qs1 to earth. In operating, relay 3QA changes over the contact 3qa1 and thus prepares relay 2Q for operation upon release of contact ca5.

When the selected article is released from its storage shelf or bin, it opens momentarily the trip contract 2TC thereby causing the release of relays 2CR and C. Relay 2CR in releasing interrupts its locking circuit by the opening of contact 2cr1, the relay C in releasing opens contact c1 and allows contact c2 to close. Relay CA remains operated over its second winding, and slow-release relay S now operates over the circuit: battery, winding of relay S, contacts pq1 and ca3 in their operated positions, contact c2 to earth. Contact s1 now opens and further interrupts the connection between relays C and 2CR, and contact s2 breaks the circuit for relay CA thus releasing this relay. The release of relay CA reverts its contacts to the condition shown in Fig. 1. Contact ca3 opens the circuit to relay S which, however, being a slow-release relay does not release immediately and thus ensures that the magnetic flux in relay CA has completely collapsed before contact s2 reverts to its closed condition. Contact ca4 reverts and operates again relay TP in the selecting relay group SRG. Contact ca5 is also closed and completes the circuit for the operation of relay 2Q from battery, over winding of relay 2Q, contacts 2qa1, 3qa1 (operated), 3qr2 (operated), ca5 to earth. This leads to the closure of contact 2q1. When relay TP has operated again over contact ca4, a circuit is closed over contact tp for another operation of relays 2CR and C, with relay 2CR locking itself over contact 2cr1 as previously described.

Relay C when operated, by means of its contact c1 causes the operation of the relay CA and also opens contact c2. Relay CA locks itself over contact ca1, opens contacts ca2 and ca5, closes contact ca3 and changes over contact ca4. Contact ca5 in opening effects the operation of relay 2QA in the same manner as described above for the relay 3QA. Relay 2QA opens contact 2qa1 and closes contact 2qa2 to prepare a circuit for the slow-release relay QS.

Upon release of the next article from the storage shelf, the trip contact 2TC is again temporarily operated and relays 2CR and C are once again released. Relay S again operates with the closure of contact c2 and opens contact s2, which results in the release of relay CA. Relay CA now being de-energised opens the contacts ca1 and ca3, closes contacts ca2 and ca5 and reverts contact ca4.

Contacts 2qa2 and ca2 are now closed and enable slow-release relay QS to operate. This relay operates over the circuit: battery, winding of relay QS, contact 2qa2 (operated) and contact ca2 to earth. Contact ca3 in opening releases the relay S, and as contacts ca4 and s1 are in their unoperated position, the circuit is once again complete for the operation of relay TP and thus of relays 2CR and C. Relay QS is energised and contacts qs1 and qs2 are opened. The contact qs1 in opening removes earth from the quantity relays 2Q, 3Q, and 2QA, 3QA which are thereby released and revert all their contacts to the condition shown in Fig. 1. Contact qs2 in opening breaks the circuit for relays PQ and 3QR, so that both these relays release. Thus the operation of the relay QS restores the quantity selection circuit to its unoperated condition. Contact 2qa2 in opening interrupts the circuit for relay QS which, however, is not immediately released for the same reason as given in connection with relay S.

So far two articles of the same character have been dispensed responsive to the operation of selection keys K0 ... K9 and quantity selection key QK3, and to complete the batch in accordance with the selected quantity, yet another article must be dispensed. The portion of the circuit which now operates to bring about the release of the next article is that shown to the left of Fig. 1, and henceforth the quantity selection equipment takes no further part in the dispensing of this further article.

The abovementioned release of relay PQ causes the contact pq1 to change back to prepare the circuit for the operation of the slow-release relay R. After the release of relay S, mentioned above, contacts s1 and s2 close and the relays 2CR, C and CA operate as previously described. Relay C, of course, operates prior to relay CA, opening its contact c2 before contact ca3 closes, thus ensuring that relay R does not operate until relay C again releases.

Upon release of the next article from storage, trip contact 2TC once again momentarily opens thereby causing relays 2CR and C to release. Contact c2 is now closed as is also contact ca3 which completes the circuit for the operation of relay R. The operation of relay R leads to the release of the relays in the selecting relay group SRG. Opening of contacts r2 and r3 interrupts the locking circuits for the relays OF and FC. The opening of contact r1 takes the earth connection off the relays TP and OT and contact r6 opens the circuit between the relays 2CR and C. Contact r5 unlocks the relay CA which leads to its release. The release of relay CA opens at contact ca3 the circuit for the operation of relay R which, however, being a slow release relay remains operated for a short time thus ensuring that all other relays are completely released before it itself releases.

The chain of events is therefore complete, and since the relays in the selecting relay group SRG have released, the equipment of Fig. 1 returns to normal and the circuit is at rest.

The foregoing description gives an example of the working of selecting and quantity ordering electrical equipment in an article dispensing system. In conjunction with this equipment two embodiments of the invention are described hereafter.

Figure 2:
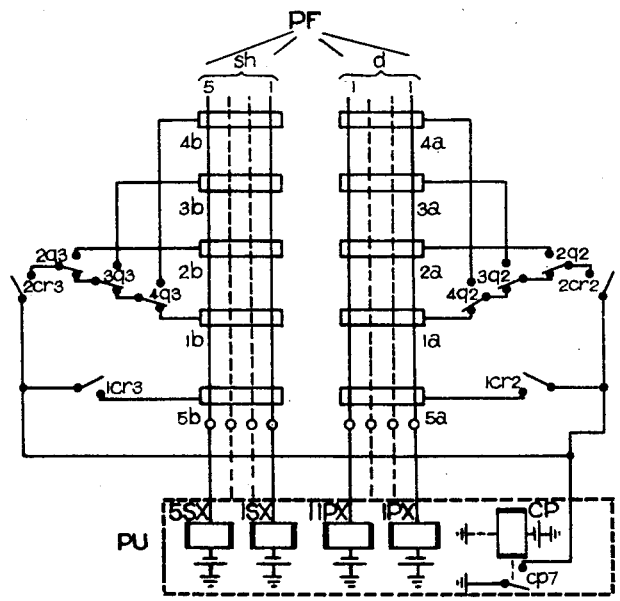
Fig. 2 illustrates diagrammatically the circuit for deriving value variations according to one embodiment of the invention.
Figure 3:
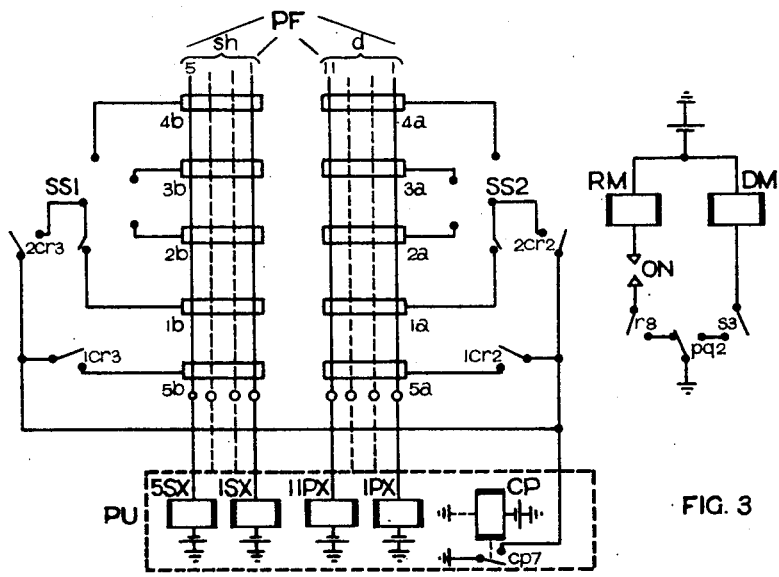
Fig. 3 illustrates another circuit for deriving value variations.

In Figs. 2 and 3, which show two embodiments of the invention, a pricing frame PF and a pricing unit PU for the registering of values of dispensed articles are shown schematically. The pricing frame PF is a form of jumpering arrangement consisting of horizontal pricing bars 1a . . . 5a, 1b . . . 5b, representing two denominations in the price of each article, and price wires or bars, representing individual values in each denomination and connected with corresponding relays in the pricing unit PU. In the example shown, price wires for values from 1 to 11 pence and 1 to 5 shillings are provided. By electrical connections between any of the horizontal bars for one denomination with any of the vertical bars for this denomination any price can be allotted to any article for registering in the pricing unit PU.

As heretofore mentioned the pricing unit PU can be of any structure which permits the registering of value indications. The pricing unit provides a registering and indication of the appropriate price charged for any article dispensed, the price being marked at the pricing frame PF by the earthing of respective pairs of pricing bars of which bars 1a . . . 5a, 1b . . . 5b are examples. Separate groups of pricing bars are provided for each denomination of the currency occurring in the price of an article, e. g. shillings and pence. Two groups are shown in Figs. 2 and 3 and in each group two price wires are shown, further price wires being indicated by dotted lines. In practice there would be as many price wires per group as there are different values in each denomination.

As shown in Figs. 2 and 3, the pricing unit PU usually includes a relay connected with each price wire, the relays 1PX . . . 11PX being used for the recording of penny amounts and the relays 1SX . . . 5SX for shilling amounts. A relay CP which is operated whenever articles are dispensed (for example operated over a contact of the relay C, Fig. 1) closes its contact cp1 to prepare an earth connection for the operation of one of the relays 1PX . . . 11PX, 1SX . . . 5SX as described later.

Referring still to Figs. 2 and 3, the lower pair of pricing bars 5a and 5b is associated with the pricing of an article for which a fixed price is charged irrespective of quantity and the pairs of bars 1a, 1b, 2a, 2b, 3a, 3b and 4a, 4b are associated with the price of an article which is sold with a price discount on a quantity basis. Each pair of these bars selects a different price for registration by the pricing unit PU by connecting the price bar electrically with the respective price wire. The four prices can be fixed at will by corresponding electrical connections between the horizontal and vertical bars. In service the pair of bars 1a and 1b will be associated with the standard price charged for a single article, bars 2a and 2b with the lower price charged for the second article of the quantity, bars 3a and 3b with the still lower price for the third article and so on.

In Figs. 2 and 3 selection of the price of articles ordered singly is controlled by the contacts 1cr2 and 1cr3 of the relay 1CR in Fig. 1. Operation of this relay, which initiates the release of one article from storage, therefore places earth on the lower pricing bars 5a and 5b in Figs. 2 and 3 over contacts 1cr2 and 1cr3 and causes the pricing unit PU to indicate the appropriate price charged for the article.

One arrangement for selecting the respective prices in accordance with a quantity of articles of the same character sold on a discount basis is shown in Fig. 2. In this figure extra contacts of the quantity selection relays 2Q, 3Q and 4Q (Fig. 1) are located in the lead from contact cp1 to the pricing bars and in accordance with their condition earth is applied to the pairs of bars 1a, 1b . . . 4a, 4b respectively conforming with the dispensed article.

The operation of the circuit of Fig. 2 will now be described when different quantities are ordered of an article sold on a discount basis. Firstly, if a single article is keyed up the quantity relays remain unoperated, and the operation of relay 2CR closes contacts 2cr2 and 2cr3. Earth is thereby applied to the pricing bar 1a over the circuit: earth, contact cp1, contacts 2cr2, 2q2, 3q2, 4q2, pricing bar 1a and one of the relays 1PX . . . 11PX. Another circuit is closed from earth over contact cp1, contacts 2cr3, 2q3, 3q3, 4q3, pricing bar 1b and one of the relays 1SX . . . 5SX, and the predetermined price associated with bars 1a and 1b is thus recorded by the pricing unit PU.

When a quantity of articles of the same character is keyed up, say 3, the quantity relay 3Q will operate as described earlier and contacts 2cr2 and 2cr3 close and earth is thus applied to the pricing bars 3a and 3b over the circuits: earth, contact cp1, contacts 2cr2, 2q2, 3q2 (now closed on top contact) to pricing bar 3a and earth, contact cp1, contacts 2cr3, 2q3, 3q3 (also closed on top contact) to pricing bar 3b. The selected price corresponding to the connections of pricing bars 3a and 3b is then indicated by the pricing unit PU.

After the release of the first article of the quantity, relay 2Q operates, as described in connection with Fig. 1, and contact 2q2 and 2q3 change over. When relay 2CR again operates to release the next article from storage, contacts 2cr2 and 2cr3 close again and earth is now applied to the pricing bars 2a and 2b, and the new selected price is indicated. During the dispensing of the last article of the quantity the quantity selection relays are released, as previously described and hence the contacts 2q2, 3q2, 2q3 and 3q3 revert to their unoperated condition. Thus when relay 2CR operates the third time earth is applied to pricing bars 1a and 1b for the recording of the price of the last article.

It should be understood that whereas the contacts of the quantity selection relays are shown in Fig. 2 as being associated with the pricing of only one individual article, similar contacts are provided in connection with each article to which quantity discount applies. Where the number of contacts required is beyond the practical capabilities of a single relay, a plurality of relays may be provided which are actuated simultaneously by the operation of the respective quantity relays.

From the above description of one embodiment of the invention as shown in Fig. 2 it will appear that the price indicated for the last dispensed article of the quantity is also the price for a single article and that in case of quantity selection the first article is at the lowest discounted price, and the price increases with each succeeding article dispensed so that the last article of the quantity will be accompanied by an indication of the full price charged per single article. If the stock of this particular article is depleted before the full quantity ordered has been dispensed reduced prices would be charged for those articles already dispensed. This disadvantage, however, is eliminated in the other embodiment of the invention described hereafter.

Referring to Fig. 3, the arrangement used for selecting the respective prices of articles of the same character sold on a discount basis embodies a rotary switch with the two banks and wipers SS1 and SS2 which are individual to the pricing circuits for the two denominations occurring in the price of one particular article. Separate banks would be provided for further articles of different kinds and where the number of banks required is beyond the practical capability of one switch, a number of switches would be provided which would all be actuated from the same circuit.

The rotary switch of Fig. 3 is in the home position when its wipers SS1 and SS2 are resting on contacts connected to the pricing bars 1a and 1b as shown in the drawing. The switch is provided with a drive magnet DM and a release magnet RM, the former operating to drive the wiper arms, step by step against spring tension, around the contact banks, and the latter operating to release the driving mechanism and to return the wipers, in one step under the control of the return spring, to the home position. The contact On is operated by the rotary switch and is always closed when the switch is off the home position.

When a quantity of articles, say 3, of the kind associated with relay 2CR (Fig. 1) are keyed up on the keyboard, the relay PQ operates as previously described. Contact pq2 (Fig. 3) changes over and prepares the circuit for the magnet DM which will operate when the contact s3 closes. For the release of the first article relay 2CR operates and closes contacts 2cr2 and 2cr3 thereby selecting the respective price for this article by earthing the pricing bars 1a and 1b. The circuit to these bars is from earth, over operated contacts cp1 and 2cr2, wiper SS2 and the first bank contact to bar 1a and from earth, over contact 2cr3, wiper SS1 and the first bank contact to bar 1b.

After the release of the first article of a selected quantity relay S operates as explained earlier and closes contact s3. The drive magnet DM is thereby energised over the circuit: battery, magnet DM, contacts s3 and pq2, to earth. The wipers SS1 and SS2 of the rotary switch step around to the next contact and at the same time contact On closes. Relay S in operating releases relay CA which then releases relay S as described above.

With the next operation of relay 2CR, contacts 2cr2 and 2cr3 close again and earth is applied over the same circuit as before to the wipers SS1 and SS2. With the wipers now being connected to the second contacts of the banks, earth is placed on the pricing bars 2a and 2b and a reduced price for the second dispensed article of the selected quantity is registered at the pricing unit PU.

After the second article has been released relay S again operates and closes contact s3. Drive magnet DM again energises and the wipers SS1 and SS2 of the rotary switch step around to the next contacts (which are those connected to bars 3a and 3b). Relays CA and S and the quantity selection circuit release as previously described in connection with Fig. 1. Relay PQ in releasing reverts its contact pq2 (Fig. 3) to its original position thereby preparing the circuit for the operation of release magnet RM as soon as contact r8 closes.

For the third article dispensed earth is applied to bars 3a and 3b in a similar manner as described above and thus the appropriate price for this third article of the selected quantity is indicated.

When the third and last article has thus been dispensed by the system, slow-release relay R operates as previously described in connection with Fig. 1, releases relay 2CR and also closes its contact r8 (Fig. 3). A circuit is now complete from battery, magnet RM, contact On, r8 and pq2, to earth and release magnet RM operates. The rotary switch therefore returns to its home position under the control of the return spring and opens contact On, and with the release of relay R all electrical circuits return to their initial condition.

One particular type of rotary switch has been described in the above passages but the use of this type is not essential to the satisfactory working of the invention. Other types of rotary switches may be used to similar effect.

From the above description of Fig. 3 it can be seen that the first dispensed article of the quantity is accompanied by the normal price for a single article, the second dispensed article by an appropriately reduced price and so on. If the stocks of this particular article are depleted before the full quantity is dispensed, the price indicated for those articles already dispensed will be correct.

Although in the foregoing description of the two embodiments it was assumed that a value reduction is given for articles dispensed in quantity, any other value variation can be achieved as the indicated value depends on the connections made at the pricing frame PF between the horizontal pricing bars and the vertical price wires. Furthermore, modifications in the article selecting arrangement and the quantity selection device can be made within the scope of this invention.

We claim:

1. In a system for dispensing articles of varied character: dispensing means for the selection and dispensing of a plurality of articles; value registering means operable under the control of said dispensing means to register the value of a dispensed article; quantity selection means and electrical connections therefrom to said dispensing means to operate said dispensing means in accordance with the quantity selected at said quantity selection means; and value variation means interposed between said dispensing means and said value registering means and electrically connected with and operable by said quantity selection means to transmit automatically to said value registering means, depending on the selected quantity, indications representing different values for articles of the same kind dispensed in immediate succession.

2. In a system for dispensing articles of varied character having a plurality of storage and releasing devices, value registering means associated therewith, and a selection device adapted to select any of said storage and releasing devices: a switch relay associated with each of said storage and releasing devices and electrically connected therewith and with said value registering means and operable under control of said selection device to dispense a selected article and to register the value of said article in said value registering means; quantity selection means and electrical connections therefrom to said selection device to operate said switch relays in accordance with the quantity selected at said quantity selection means; and value variation means interposed between said switch relays and said value registering means and electrically connected with and operable by said quantity selection means to transmit automatically to said value registering means, depending on the selected quantity, indications representing different values for articles of the same kind dispensed in immediate succession.

3. In a system for dispensing articles of varied character: dispensing means for the selection and dispensing of a plurality of articles; value registering means operable under the control of said dispensing means to register the value of a dispensed article; quantity selection means including relay means operable successively in accordance with the quantity selected and electrical connections from said quantity selection means to said dispensing means to operate said dispensing means in accordance with said selected quantity; and value variation means including for each article selectable in quantity electrical contacts operable by said relay means, said value variation means being interposed between said dispensing means and said value registering means to transmit automatically to said value registering means, depending on the operation of said electrical contacts by said relay means, indications representing different values for articles of the same kind dispensed in immediate succession.

4. In a system for dispensing articles of varied character: dispensing means for the selection and dispensing of a plurality of articles; value registering means operable under the control of said dispensing means to register the value of a dispensed article; quantity selection means including relay means operable successively in accordance with the quantity selected and electrical connections from said quantity selection means to said dispensing means to operate said dispensing means in accordance with said selected quantity; and value variation means interposed between said dispensing means and said value registering means and including for each article selectable in quantity electrical contacts operable by said relay means, and in their unoperated position connected in series to transmit to said value registering means an indication corresponding to the value allotted to a single article and in their operated position connected individually with said value registering means to transmit to said value registering means, depending on the selected quantity, indications representing different values for articles of the same kind dispensed in immediate succession.

5. In a system for dispensing articles of varied character: dispensing means for the selection and dispensing of a plurality of articles; value registering means operable under the control of said dispensing means to register the value of a dispensed article; quantity selection means and electrical connections therefrom to said dispensing means to operate said dispensing means in accordance with the quantity selected at said quantity selection means; and value registering means including for each article selectable in quantity rotary switches electrically connected with and operable by said quantity selection means to transmit automatically to said value registering means, depending on the positioning of said rotary switches by said quantity selection means, indications representing different values for articles of the same kind dispensed in immediate succession.

6. In a system for dispensing articles of varied character: dispensing means for the selection and dispensing of a plurality of articles; value registering means operable under the control of said dispensing means to register the value of a dispensed article; quantity selection means and electrical connections therefrom to said dispensing means to operate said dispensing means in accordance with the quantity selected at said quantity selection means; value variation means interposed between said dispensing means and said value registering means and electrically connected with and operable by said quantity selection means and a jumpering arrangement consisting of two groups of conductors and exchangeable connections between any conductor of the first group and any conductor of the second group and electrical connections from the conductors of the first group to said value variation means and from the conductors of the second group to said value registering means to transmit automatically to said value registering means, depending on the operation of said value variation means by said quantity selection means, indications representing different values for articles of the same kind dispensed in immediate succession.

7. In a system for dispensing articles of varied character: dispensing means for the selection and dispensing of a plurality of articles; value registering means operable under the control of said dispensing means to register the value of a dispensed article in the denominations occurring in said value; quantity selection means and electrical connections therefrom to said dispensing means to operate said dispensing means in accordance with the quantity selected at said quantity selection means; value variation means for each denomination occurring in the value of an article selectable in quantity; a jumpering arrangement consisting of a first group of conductors for each denomination electrically connected with said value variation means, a second group of conductors for each denomination electrically connected with said value registering means and exchangeable connections between the conductors of said first group and the conductors of said second group; and electrical connections from said dispensing means to said value variation means to transmit automatically to said value registering means, depending on the operation of said value variation means by said quantity selection means, indications representing different values in said denominations for articles of the same kind dispensed in immediate succession.

8. In a system for dispensing articles of varied character: dispensing means for the selection and dispensing of a plurality of articles including switch relays individual to each kind of article to be dispensed, and common relay means operable together with any of said switch relays; quantity selection means comprising key-operated contact means, quantity relay means electrically connected with and selectively operable by said contact means, counting relay means and electrical connections from said counting relay means to said quantity relay means and said common relay means to set said counting relay means in accordance with the selected quantity determined by said quantity relay means and to count the quantity of dispensed articles depending on the operation of said common relay means, a first slow-release relay and electrical connections therefrom to said quantity relay means and said common relay means to repeat the cycle of operations of a selected switch relay and said common relay means, and a second slow-release relay and electrical connections therefrom to said quantity relay means, said counting relay means and said common relay means to restore said quantity relay means and said counting relay means to their initial position; value registering means operable under the control of said switch relays to register the value of a dispensed article; and value variation means interposed between contacts of said switch relays and said value registering means and including for each article selectable in quantity electrical contacts operable by said counting relay means to transmit automatically to said value registering means depending on the operation of said electrical contacts by said counting relay means, indications representing different values for articles of the same kind dispensed in immediate succession.

9. In a system for dispensing articles of varied character: dispensing means for the selection and dispensing of a plurality of articles including switch relays individual to each kind of article to be dispensed, and common relay means operable together with any of said switch relays; quantity selection means comprising key-operated contact means, quantity relay means electrically connected with and selectively operable by said contact means, counting relay means and electrical connections from said counting relay means to said quantity relay means and said common relay means to set said counting relay means in accordance with the selected quantity determined by said quantity relay means and to count the quantity of dispensed articles depending on the operation of said common relay means, a first slow-release relay and electrical connections therefrom to said quantity relay means and said common relay means to repeat the cycle of operations of a selected switch relay and said common relay means, and a second slow-release relay and electrical connections therefrom to said quantity relay means, said counting relay means and said common relay means to restore said quantity relay means and said counting relay means to their initial position; value registering means operable under the control of said switch relays to register the value of a dispensed article; and value variation means interposed between contacts of said switch relays and said value registering means and including for each article selectable in quantity rotary switches, the driving magnet for said rotary switches being electrically connected with and operated by said first slow-release relay, said rotary switches transmitting automatically to said value registering means, depending on the positioning of said rotary switches by said first slow-release relay, indications representing different values for articles of the same kind dispensed in immediate succession.

10. In a system for dispensing articles of varied character: dispensing means for the selection and dispensing of a plurality of articles including switch relays individual to each kind of article to be dispensed, and common relay means operable together with any of said switch relays; quantity selection means comprising key-operated contact means, quantity relay means and electrical connections therefrom to said key-operated contact means, counting relay means arranged in pairs and electrical contact means operable by said quantity relay means interposed in the operating circuits of corresponding pairs of counting relay means to operate one relay means of a pair selected by said quantity relay means, contact means of said common relay means electrically connected with said counting relay means to operate the other relay means of said selected pair, said other relay means operating the counting relay means of the next pair, a first slow-release relay electrically connected with and operable by said common relay means and said quantity relay means to repeat the cycle of operations of a selected switch relay and said common relay means, and a second slow-release relay and electrical connections therefrom to said common relay means, said counting relay means and said quantity relay means to restore said counting relay means and said quantity relay means to their initial position after the operation of the last pair of said counting relay means; a third slow-release relay and electrical connections therefrom to said common relay means and said quantity relay means and operable thereby to restore all circuits to their initial position after the dispensing of the required quantity of a kind of article; value registering means operable under the control of said switch relays to register the value of a dispensed article; and value variation means interposed between said dispensing means and said value registering means and electrically connected with and operable by said quantity selection means to transmit automatically to said registering means, depending on the selected quantity, indications representing different values for articles of the same kind dispensed in immediate succession.

THOMAS S. SKILLMAN.
ALAN D. LACKEY.

No references cited.